US012054944B2

(12) United States Patent
Dolby et al.

(10) Patent No.: US 12,054,944 B2
(45) Date of Patent: Aug. 6, 2024

(54) CURTAIN WALL FRAME GASKETS

(71) Applicant: Arconic Technologies LLC, Pittburgh, PA (US)

(72) Inventors: Jeffrey S. Dolby, Buford, GA (US); Matthew M. Miller, Atlanta, GA (US); Gregory B. McKenna, Cumming, GA (US)

(73) Assignee: Arconic Technologies LLC, Pittsburgh, PA (US)

( * ) Notice: Subject to any disclaimer, the term of this patent is extended or adjusted under 35 U.S.C. 154(b) by 331 days.

(21) Appl. No.: 17/601,256

(22) PCT Filed: May 5, 2020

(86) PCT No.: PCT/US2020/031471

§ 371 (c)(1),
(2) Date: Oct. 4, 2021

(87) PCT Pub. No.: WO2020/227290

PCT Pub. Date: Nov. 12, 2020

(65) Prior Publication Data

US 2022/0195727 A1 Jun. 23, 2022

Related U.S. Application Data

(60) Provisional application No. 62/843,719, filed on May 6, 2019, provisional application No. 62/928,045, filed on Oct. 30, 2019.

(51) Int. Cl.
*E04B 2/96* (2006.01)
*E06B 3/263* (2006.01)

(52) U.S. Cl.
CPC .......... *E04B 2/967* (2013.01); *E06B 3/26341* (2013.01)

(58) Field of Classification Search
CPC ...... E04B 2/967; E06B 3/26341; E06B 3/549; E06B 2003/6244; E06B 2003/6261
See application file for complete search history.

(56) References Cited

U.S. PATENT DOCUMENTS 4,418,506 A * 12/1983 Weber .................... E04B 2/967 52/204.593
4,608,793 A * 9/1986 Yost .......................... E06B 7/14 52/204.597

(Continued)

FOREIGN PATENT DOCUMENTS

CN 108277916 A 7/2018
KR 10-1763158 B1 8/2017

(Continued)

OTHER PUBLICATIONS

ISR-WO dated Aug. 12, 2020 for parent application PCT/US2020/031471.

*Primary Examiner* — Rodney Mintz
(74) *Attorney, Agent, or Firm* — Vorys, Sater, Seymour and Pease LLP

(57) ABSTRACT

A curtain wall system includes a vertical member and a horizontal member coupled to the vertical member at a joint. A vertical bridge gasket is coupled to the vertical member and includes a vertically-extending interior gasket, a vertically-extending thermal break gasket, and a vertical bridge member extending between the vertically-extending interior and thermal break gaskets. A horizontal bridge gasket is coupled to the horizontal member and joined to the vertical bridge gasket at a corner joint, the horizontal bridge gasket includes a horizontally-extending interior gasket, a horizontally-extending thermal break gasket, and a horizontal bridge member extending between the horizontally-extend- (Continued)

ing interior and thermal break gaskets. The vertical and horizontal bridge gaskets cover the joint between the vertical and horizontal members.

19 Claims, 8 Drawing Sheets

(56) References Cited

U.S. PATENT DOCUMENTS

| | | | | |
|---|---|---|---|---|
| 4,619,092 | A | 10/1986 | Kaminaga | |
| 4,756,132 | A * | 7/1988 | Newman | E04B 2/965 52/745.12 |
| 5,309,689 | A | 5/1994 | Croissant | |
| 7,779,584 | B2 * | 8/2010 | Arias | E04B 2/965 52/204.597 |
| 9,909,306 | B2 * | 3/2018 | Dolby | E04B 2/967 |
| 10,309,150 | B2 * | 6/2019 | McKenna | E06B 3/26 |
| 10,563,449 | B2 * | 2/2020 | McKenna | E06B 3/26 |
| 10,619,399 | B2 * | 4/2020 | McKenna | E06B 1/366 |
| 10,711,514 | B2 * | 7/2020 | Koster | E06B 3/9616 |
| 10,844,651 | B2 * | 11/2020 | Koster | E06B 3/26303 |
| 11,187,323 | B2 * | 11/2021 | Sprague | F16J 15/0818 |
| 11,225,825 | B2 * | 1/2022 | McKenna | E06B 3/549 |
| 2006/0201084 | A1 * | 9/2006 | Arias | E04B 2/965 52/235 |
| 2017/0022708 | A1 * | 1/2017 | Dolby | E06B 3/5481 |
| 2019/0078375 | A1 * | 3/2019 | McKenna | E06B 3/26 |
| 2019/0078380 | A1 * | 3/2019 | McKenna | E06B 3/5481 |
| 2019/0264491 | A1 * | 8/2019 | McKenna | E06B 3/26 |
| 2020/0032572 | A1 * | 1/2020 | Koster | E06B 7/2312 |
| 2020/0032575 | A1 * | 1/2020 | Koster | E06B 3/9616 |
| 2021/0054679 | A1 * | 2/2021 | McKenna | E06B 3/549 |
| 2021/0285546 | A1 * | 9/2021 | Sprague | E06B 3/5454 |
| 2023/0358035 | A1 * | 11/2023 | Wilson | E04B 2/94 |
| 2023/0358037 | A1 * | 11/2023 | Wilson | E04B 1/04 |
| 2023/0358038 | A1 * | 11/2023 | Wilson | E04B 2/822 |
| 2023/0358039 | A1 * | 11/2023 | Wilson | E04B 2/822 |
| 2023/0358040 | A1 * | 11/2023 | Wilson | E04B 2/02 |
| 2023/0358055 | A1 * | 11/2023 | Wilson | E04B 1/6813 |
| 2023/0383528 | A1 * | 11/2023 | Wilson | E04F 13/0891 |
| 2023/0383536 | A1 * | 11/2023 | Wilson | F16J 15/061 |

FOREIGN PATENT DOCUMENTS

| | | | |
|---|---|---|---|
| WO | 2013-090415 | A1 | 6/2013 |
| WO | 2020227290 | A1 | 11/2020 |

* cited by examiner

CURTAIN WALL FRAME GASKETS

BACKGROUND

Windows are commonly used in residential and commercial buildings, e.g., in storefronts and in curtain walls used on the façade of high-rise buildings. Aesthetic considerations play an important part in architectural design, including the design of window systems and curtain walls. The architecture of curtain walls for residential and commercial buildings typically include a plurality of vertical structural elements secured to a plurality of horizontal structural elements, and the interconnected vertical and horizontal structural elements are adapted to frame and hold glazing panels, such as panes of window glass, polycarbonates, or other clear, translucent, tinted, or opaque panels.

Glazing panels are conventionally secured to the interconnected vertical and horizontal structural elements using an assembly of gaskets, silicone adhesives, sealants, and/or structural tapes that seal the joints in the framing system against water and air infiltration. Currently, the installer must cut gaskets to length on site and install the individual gaskets in channels defined in the vertical and horizontal structural elements. Liquid sealant must then be applied at the corners of the vertical and horizontal structural elements and joint plug areas and allowed to cure to complete a full gasket seal around individual frames on the interior of the curtain wall.

Properly sealing a glazing panel within a curtain wall frame can be a time consuming process that requires skilled labor. Moreover, this installation process requires the use of substantial amount of liquid sealant and is prone to user error if not carefully undertaken.

SUMMARY OF THE DISCLOSURE

Embodiments disclosed herein include a curtain wall system that includes a vertical member, a horizontal member coupled to the vertical member at a joint, and a vertical bridge gasket coupled to the vertical member. The vertical bridge gasket includes a vertically-extending interior gasket, a vertically-extending thermal break gasket, and a vertical bridge member extending between the vertically-extending interior and thermal break gaskets. The curtain wall system further includes a horizontal bridge gasket coupled to the horizontal member and joined to the vertical bridge gasket at a corner joint, the horizontal bridge gasket including a horizontally-extending interior gasket, a horizontally-extending thermal break gasket, and a horizontal bridge member extending between the horizontally-extending interior and thermal break gaskets, wherein the vertical and horizontal bridge gaskets cover the joint between the vertical and horizontal members. In a further embodiment of the curtain wall system, the vertical member defines a first vertical channel and a second vertical channel, and the horizontal member defines a first horizontal channel and a second horizontal channel, and wherein the vertically-extending interior gasket is coupled to the first vertical channel, the vertically-extending thermal break gasket is coupled to the second vertical channel, the horizontally-extending interior gasket is coupled to the first horizontal channel, and the horizontally-extending thermal break gasket is coupled to the second horizontal channel. In another further embodiment of any of the previous embodiments, the curtain wall system may further include a glazing panel mounted adjacent the vertical and horizontal members, wherein the vertically-extending interior gasket interposes the vertical member and the glazing panel, and the horizontally-extending interior gasket interposes the horizontal member and the glazing panel. In another further embodiment of any of the previous embodiments, wherein the vertical member provides a vertical tongue that defines the second vertical channel, and the horizontal member provides a horizontal tongue that defines the second horizontal channel. In another further embodiment of any of the previous embodiments, the curtain wall system may further include a first pressure plate secured to the vertical tongue with a first fastener, wherein the vertically-extending thermal break gasket interposes the first pressure plate and the vertical tongue, and a second pressure plate secured to the horizontal tongue with a second fastener, wherein the horizontally-extending thermal break gasket interposes the second pressure plate and the horizontal tongue. In another further embodiment of any of the previous embodiments, the curtain wall system may further include a vertical tongue extending from the vertical member, a first thermal tongue extension interposing the vertically-extending thermal break gasket and the vertical tongue, wherein the second vertical channel is defined in the first thermal tongue extension, a horizontal tongue extending from the vertical member, and a second thermal tongue extension interposing the horizontally-extending thermal break gasket and the horizontal tongue, wherein the second vertical channel is defined in the second thermal tongue extension. In another further embodiment of any of the previous embodiments, the curtain wall system may further include a first vertical dart extending along at least a portion of the length of the vertically-extending interior gasket and received within the first vertical channel, a second vertical dart extending along at least a portion of the length of the vertically-extending thermal break gasket and received within the second vertical channel, a first horizontal dart extending along at least a portion of the length of the horizontally-extending interior gasket and received within the first horizontal channel, and a second horizontal dart extending along at least a portion of the length of the horizontally-extending thermal break gasket and received within the second horizontal channel. In another further embodiment of any of the previous embodiments, the vertical bridge member is angled by about 90° to extend to each of the vertically-extending thermal break and interior gaskets, and the horizontal bridge member is angled by about 90° to extend to each of the horizontally-extending thermal break and interior gaskets. In another further embodiment of any of the previous embodiments, the vertical bridge gasket is a first vertical bridge gasket, and the horizontal bridge gasket is first horizontal bridge gasket, the curtain wall system further including a second vertical bridge gasket laterally offset from the first vertical bridge gasket and including a vertically-extending interior gasket, a vertically-extending thermal break gasket, and a vertical bridge member extending between the vertically-extending interior and thermal break gaskets of the second vertical bridge gasket, and a horizontal bridge gasket vertically-offset from the first horizontal bridge gasket and including a horizontally-extending interior gasket, a horizontally-extending thermal break gasket, and a horizontal bridge member extending between the horizontally-extending interior and thermal break gaskets of the second horizontal bridge gasket, wherein the first and second horizontal bridge gaskets extend between the first and second vertical bridge gaskets, and wherein each end of the first and second horizontal bridge gaskets is joined to a corresponding end of the first and second vertical bridge gaskets at corresponding corner joints to form a four-sided frame.

Embodiments disclosed herein may further include a curtain wall frame gasket that may include first and second vertical bridge gaskets laterally-offset from each other, each vertical bridge gasket including a vertically-extending thermal break gasket, a vertically-extending interior gasket, and a vertical bridge member extending between the vertically-extending thermal break and interior gaskets, and first and second horizontal bridge gaskets vertically-offset from each other, each horizontal bridge gasket including a horizontally-extending thermal break gasket, a horizontally-extending interior gasket, and a horizontal bridge member extending between the horizontally-extending thermal break and interior gaskets, wherein the first and second horizontal bridge gaskets extend between the first and second vertical bridge gaskets, and wherein each end of the first and second horizontal bridge gaskets is joined to a corresponding end of the first and second vertical bridge gaskets at corresponding corner joints to form a four-sided frame. In a further embodiment, the curtain wall frame gasket may include a first relief defined in the first horizontal bridge gasket, and a second relief defined in the second horizontal bridge gasket and vertically-aligned with the first relief. In a further embodiment, each corner joint of the corresponding corner joints forms a 90° angle between each end of the first and second horizontal bridge gaskets and the corresponding end of the first and second vertical bridge gaskets. In a further embodiment, the curtain wall frame gasket may include a first vertical dart extending along at least a portion of the length of the vertically-extending thermal break gasket, a second vertical dart extending along at least a portion of the length of the vertically-extending interior gasket, a first horizontal dart extending along at least a portion of the length of the horizontally-extending thermal break gasket, and a second horizontal dart extending along at least a portion of the length of the horizontal-extending interior gasket. In a further embodiment, the curtain wall frame gasket further includes one or more barbs defined on one or both of the first vertical dart and the first horizontal dart. In a further embodiment, the vertical bridge member is angled by about 90° to extend to each of the vertically-extending thermal break and interior gaskets, and the horizontal bridge member is angled by about 90° to extend to each of the horizontally-extending thermal break and interior gaskets.

Embodiments disclosed herein may further include a method of sealing an interior of a curtain wall system including a vertical member and a horizontal member coupled to the vertical member at a joint, the method including coupling a vertical bridge gasket to the vertical member, the vertical bridge gasket including a vertically-extending interior gasket, a vertically-extending thermal break gasket, and a vertical bridge member extending between the vertically-extending interior and thermal break gaskets. The method may further include coupling a horizontal bridge gasket to the horizontal member, the bridge gasket being joined to the vertical bridge gasket at a corner joint and including a horizontally-extending interior gasket, a horizontally-extending thermal break gasket, and a horizontal bridge member extending between the horizontally-extending interior and thermal break gaskets. The method may further include covering the joint between thermal break the vertical and horizontal members with the vertical and horizontal bridge gaskets. In a further embodiment, the vertical member defines first and second vertical channels, and the horizontal member defines a first and second horizontal channels, the method may further include coupling the vertically-extending interior gasket to the first vertical channel, coupling the vertically-extending thermal break gasket to the second vertical channel, coupling the horizontally-extending interior gasket to the first horizontal channel, and coupling the horizontally-extending thermal break gasket to the second horizontal channel. In a further embodiment, the method may include mounting a glazing panel adjacent the vertical and horizontal members, arranging the vertically-extending interior gasket between the vertical member and the glazing panel, and arranging the horizontally-extending interior gasket between the horizontal member and the glazing panel. In a further embodiment, the vertical member provides a vertical tongue that defines the second vertical channel, and the horizontal member provides a horizontal tongue that defines the second horizontal channel, the method may further include securing a first pressure plate to the vertical tongue with a first fastener, wherein the vertically-extending thermal break gasket interposes the first pressure plate and the vertical tongue, and securing a second pressure plate to the horizontal tongue with a second fastener, wherein the horizontally-extending thermal break gasket interposes the second pressure plate and the horizontal tongue. In a further embodiment, the vertical member provides a vertical tongue and the horizontal member provides a horizontal tongue, the method may further include arranging a first thermal tongue extension between the vertically-extending thermal break gasket and the vertical tongue, wherein the second vertical channel is defined in the first thermal tongue extension, and arranging a second thermal tongue extension between the horizontally-extending thermal break gasket and the horizontal tongue, wherein the second vertical channel is defined in the second thermal tongue extension.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to building products and, more particularly, to window structures, window frames, curtain walls, and curtain wall assemblies with improved seals.

Figure 1:
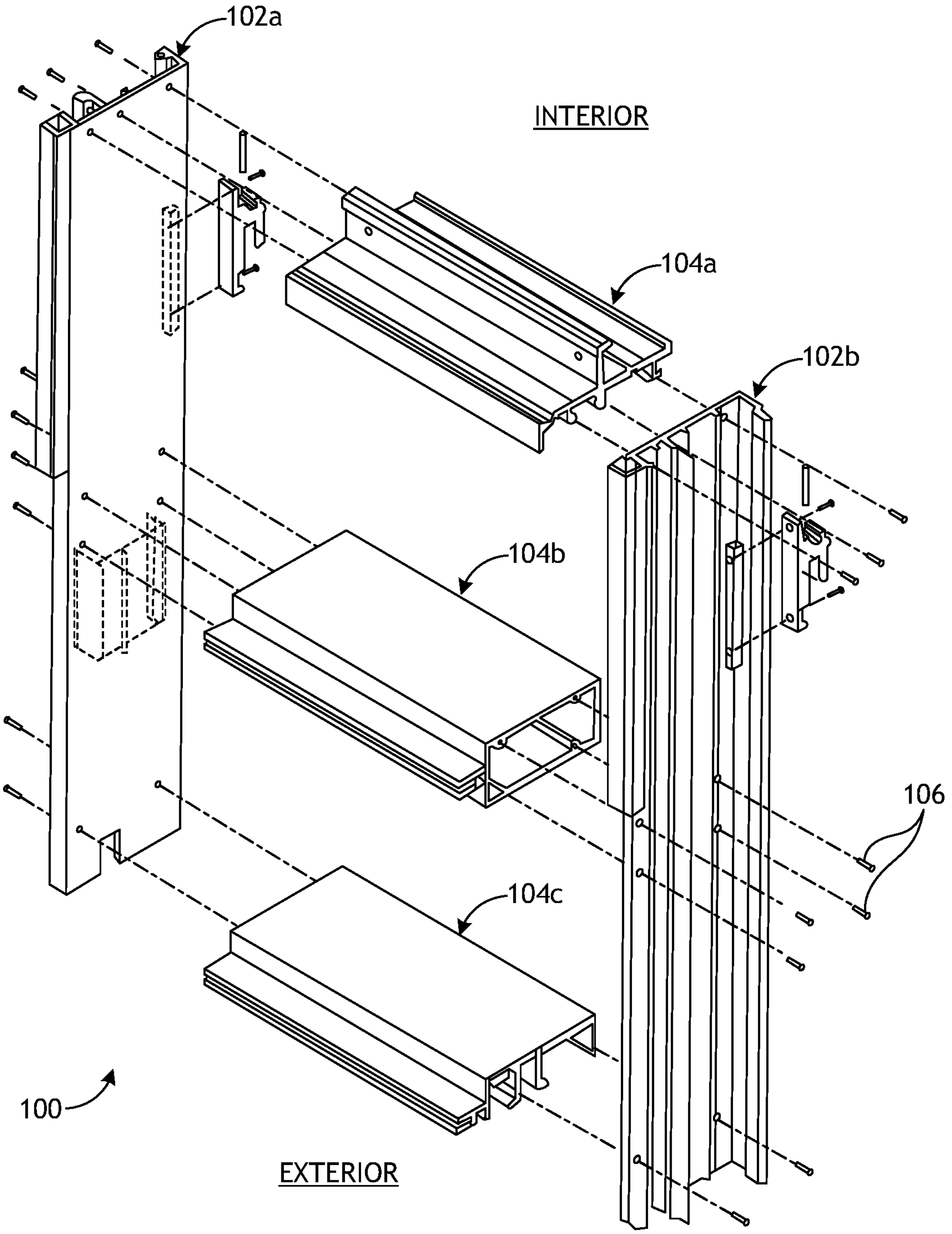
FIG. 1 is an isometric exploded view of an example window chassis subassembly.

FIG. 1 is an isometric exploded view of an example window chassis subassembly 100. The chassis subassembly 100 can form part of a window system or a curtain wall for a building. As illustrated, the chassis subassembly 100 includes vertical members 102*a* and 102*b*, and horizontal members 104*a*, 104*b*, and 104*c*. The vertical and horizontal members 102*a,b* and 104*a-c* are adapted to cooperatively frame and hold a glazing panel (not shown), such as a pane of window glass, polycarbonate, or another clear, translucent, tinted, or opaque panel. In some applications, the vertical and horizontal members 102*a,b*, 104*a-c* can be adapted to frame and hold a plurality of glazing panels. The vertical and horizontal members 102*a,b* and 104*a-c* are joined by one or more mechanical fasteners 106 (e.g., screws, rivets, bolts, etc.) to form the assembled chassis subassembly 100. In some embodiments the fasteners 106 may be supplemented with or otherwise replaced with welds or rivets that can also help assemble the chassis subassembly 100.

The chassis subassembly 100 may be designed for installation in a large commercial building, such as a low- to mid-rise building, but the principles of the present disclosure could be equally applicable to skyscrapers. In such embodiments, the vertical and horizontal members 102*a,b* and 104*a-c* will typically be extruded from an aluminum alloy, which is a strong, lightweight and corrosion-resistant material, but the vertical and horizontal members 102*a,b* and 104*a-c* could alternatively by formed of other materials, such as other metals or metal alloys. As will be appreciated, the technology of this disclosure may also be applicable to smaller commercial or residential buildings.

Figure 2:
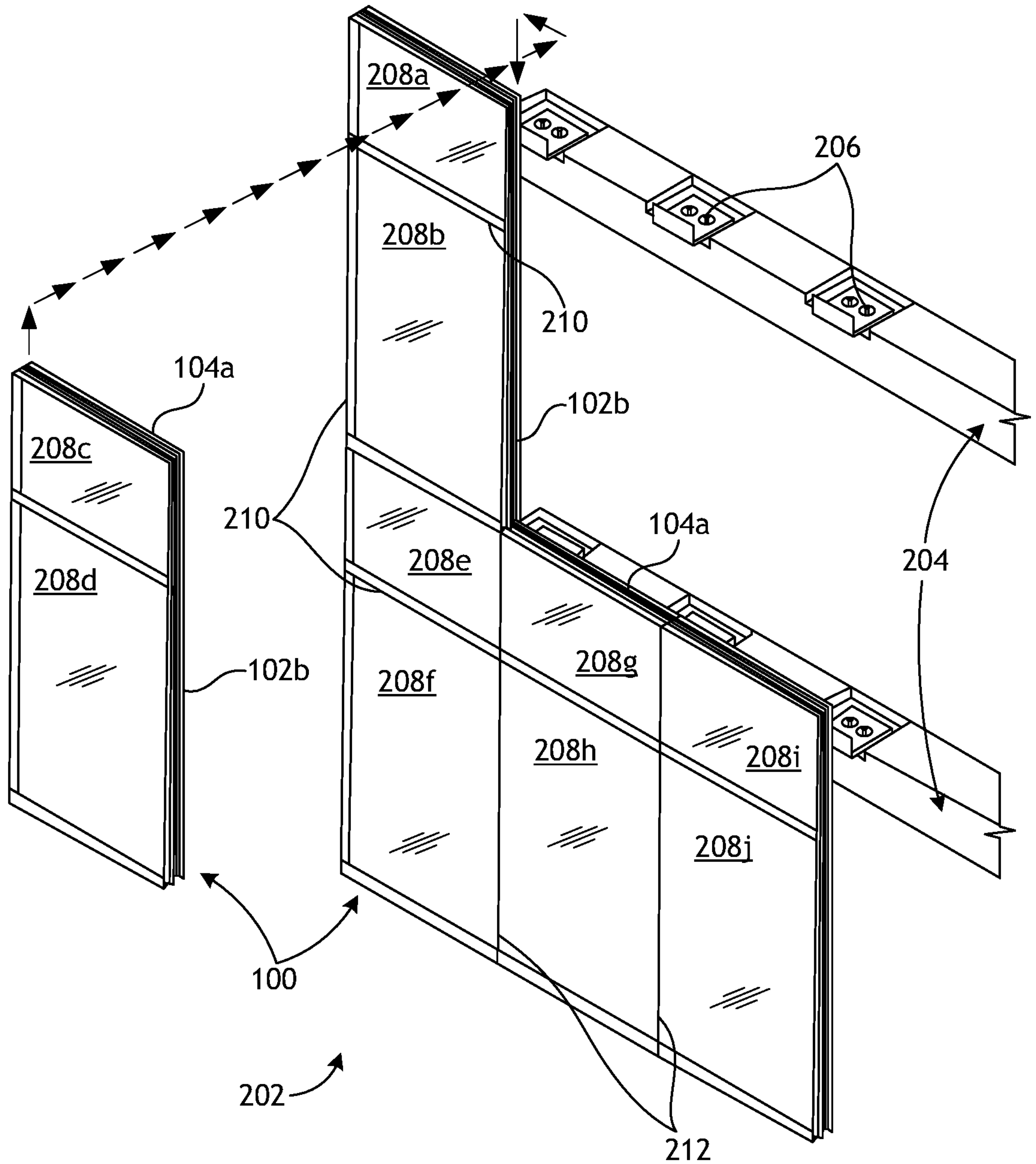
FIG. 2 is an isometric view of a plurality of chassis subassemblies assembled to form a portion of an example curtain wall system.

FIG. 2 is an isometric view of a plurality of chassis subassemblies 100 assembled to form a portion of a curtain wall system 202. The curtain wall system 202 may be secured to a building structure that includes one or more beams 204 or a floor slab forming part of the building structure. More specifically, the chassis subassemblies 100 are coupled to one another and to one or more brackets 206 secured to the beams 204 or floor slab to form the curtain wall.

The chassis subassemblies 100 include and otherwise frame a plurality of glazing panels 208*a*-208*j* (e.g., glass), alternately referred to as "glazing units," installed therein between the vertical and horizontal members (102*b* and 104*a* shown). In modern construction, the glazing panels 208*a-j* are typically double or triple glazed with air, an inert gas, and/or a coating(s) between adjacent panels to control transmission of thermal energy by radiation and convection between the interior of the building and the exterior environment.

The glazing panels 208*a-j* are conventionally secured to the corresponding chassis subassemblies 100 using gaskets, silicone adhesives, sealants, and/or structural tapes. Embodiments described herein, however, discuss improved gaskets and gasket assemblies that eliminate the need to apply silicone adhesives or sealants at gasket joints and the joints between the vertical and horizontal members, around joint plugs, and over the screw heads that secure the vertical and horizontal members together.

In some installations, one or more cover elements or "covers" 210 may be used. The covers 210 provide an architectural finishing detail between adjacent glazing panels 208*a-j* and simultaneously provide a mechanism for supporting the glazing panels 208*a-j* in place on the curtain wall system 202, e.g., as a back-up or supplemental support for a glazing unit, which is adhered to the chassis subassembly 100. The covers 210 may also help insulate and occlude gaps 212 between adjacent glazing panels 208*a-j* and thereby help prevent the influx of foreign matter, such as dirt, leaves, debris, insects, birds, etc. into the gaps 212. The covers 210 can also help reduce wind noise generated by air flowing through or proximate the gaps 212.

Figure 3:
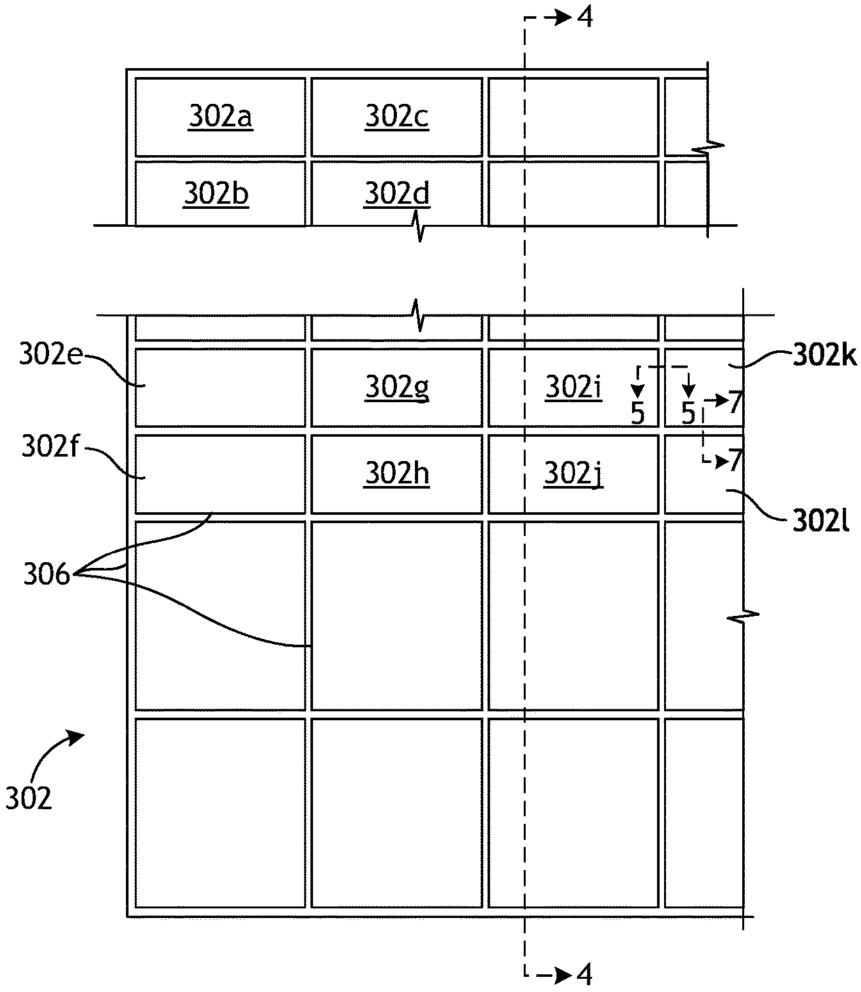
FIG. 3 is a front view of a portion of another example curtain wall system.
Figure 4:
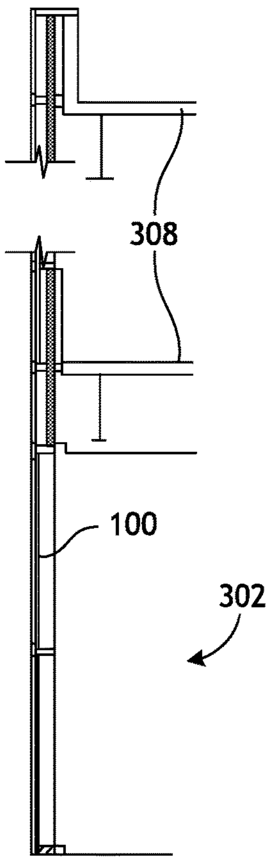
FIG. 4 is a side view of the curtain wall system of FIG. 3 taken along lines 4-4 in FIG. 3.

FIG. 3 is a front view of a portion of another example curtain wall system 302 and FIG. 4 is a side view of the curtain wall system 302 taken along the dashed line 4-4 of FIG. 3. The curtain wall system 302 is similar in some respects to the curtain wall system 202 of FIG. 2. For example, the curtain wall system 302 includes a plurality of glazing panels 302*a-l* and a corresponding plurality of covers 306 that occlude the gaps defined between laterally and vertically offset glazing panels 302*a-l*. In the illustrated example, the curtain wall system 302 is "fully captured" in that the glazing panels 302*a-l* are surrounded on all sides by the covers 306 in the vertical and horizontal directions. As shown in FIG. 4, the above-described chassis subassemblies 100 may be used to help fasten the curtain wall system 302 to a building structure 308.

The intersections of the vertical and horizontal members of the chassis subassembly 100 require proper seals and sealing techniques to prevent the influx of fluids (e.g., water and air) into the interior of each curtain wall system 202 and 302. Currently, gaskets must be cut on-site by installers and installed as cut lengths into gasket channels defined in the vertical and horizontal members. A liquid sealant (e.g., silicone, rubber bonding cement, etc.) is then applied by the installer at the intersection of the vertical and horizontal members, the exposed ends of the gaskets, and the joint plug areas (e.g., areas designed to allow weeping and horizontal mullion continuity). The curing of sealant will result in a full gasket seal provided around individual frames on the interior side of the curtain wall.

According to embodiments of the present disclosure, a new gasket sealing system is disclosed that eliminates the need to cut the gaskets to length and apply liquid sealant at various locations on the interior side of the curtain wall to properly seal the glazing panel. The frame gaskets described herein can be easily installed as a continuous frame into the frame opening prior to installing the glazing panels. The frame gaskets can be pre-formed by a supplier into a four-sided frame that will act as a water/air barrier that eliminates the need to wet seal the vertical-to-horizontal intersections and joint plug areas with liquid sealant. The frame gaskets, however, can be pre-formed to have more than four sides or any other number of sides, such as an octagonal gasket, without departing from the scope of the disclosure. Moreover, those skilled in the art will readily appreciate that the principles of the present disclosure can be incorporated into all pressure plate curtain wall systems.

Figure 5:
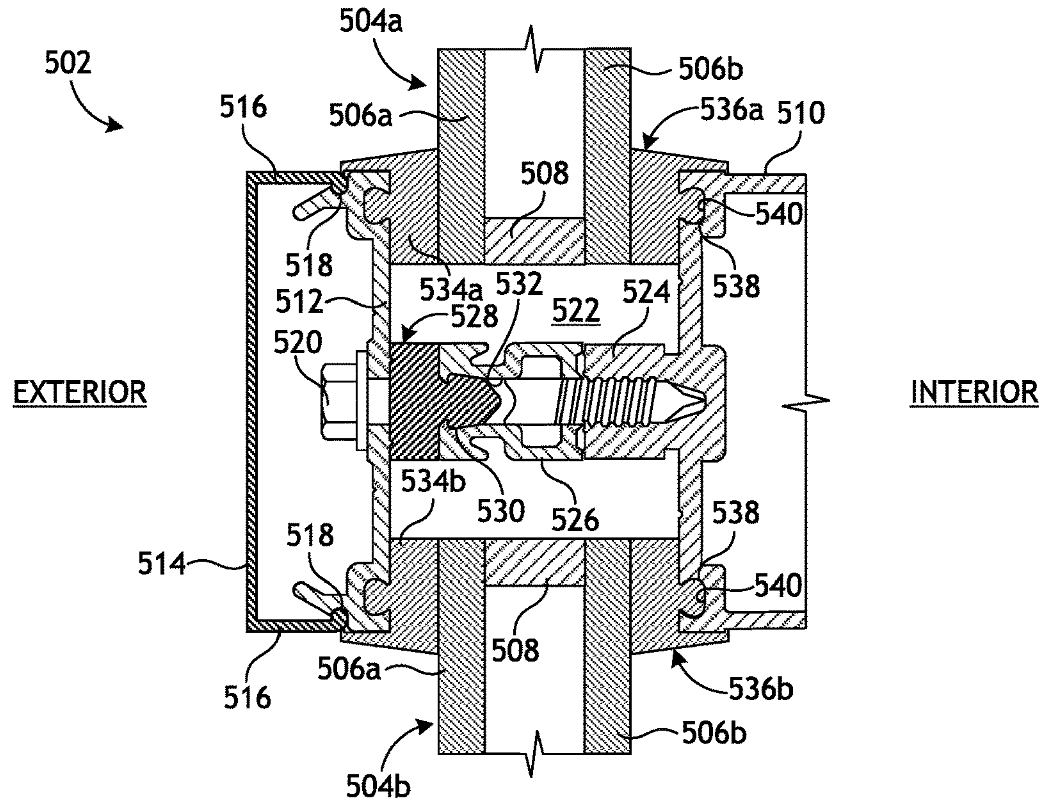
FIG. 5 PRIOR ART
FIG. 5 is a cross-sectional top view of a prior art vertical member assembly taken along the lines 5-5 in FIG. 3.

FIG. 5 is a cross-sectional top view of a prior art vertical member assembly 502 taken along the lines 5-5 in FIG. 3. The vertical member assembly 502 may not only form part of the curtain wall system 302 of FIG. 3, but may also form part of the curtain wall system 202 of FIG. 2. The vertical member assembly 502 may be similar in some respects to the vertical members 102*a,b* of FIG. 1 and may thus be vertically oriented.

The vertical member assembly 502 may be configured to help laterally support and/or secure one or more glazing panels, shown in FIG. 5 as a first glazing panel 504*a* and a glazing second panel 504*b*. The glazing panels 504*a,b* may comprise one or more panes of window glass, one or more panes of polycarbonate, or one or more panels of another material that is clear, translucent, tinted, or opaque, without departing from the scope of the disclosure.

As illustrated each glazing panel 504*a,b* includes a first or "exterior" glass panel 506*a* and a second or "interior" glass panel 506*b* with a spacer 508 positioned therebetween. The space between the first and second glass panels 506*a,b* may be filled with air or an inert gas to help control transmission of thermal energy by radiation and convection between the interior of the building and the exterior environment. Alternatively, one or more plastic films or low-e coatings may be positioned within the space to help control transmission of thermal energy. Accordingly, the glazing panels 504*a,b* may each comprise a conventional "double-glazed" frame arrangement. It will be appreciated, however, that the principles of the present disclosure may be equally applicable to other glazing panel designs and configurations, without departing from the scope of the disclosure.

As illustrated, the vertical member assembly 502 includes a vertical member 510, alternately referred to as a "mullion." The vertical member 510 may also be referred to as a "transverse" member since it does not necessarily have to be perfectly vertical or otherwise orthogonal from a horizontal plane. The vertical member 510 may comprise a rigid extrusion made of aluminum, an aluminum alloy, or other metals and metal alloys. The vertical member 510 may be coupled to the building structure, such as a beam (e.g., the beams 204 of FIG. 2) that forms part of the building structure.

The vertical member assembly 502 further includes a pressure plate 512 and a cover 514 removably coupled to the pressure plate 512. The cover 514 may be similar to the covers 210, 306 of FIGS. 2 and 3, respectively, and, therefore, may provide an architectural finishing detail while simultaneously covering a vertical gap between the first and second glazing panels 504*a,b*. As illustrated, the cover 514 may provide lateral extensions 516 receivable within corresponding recesses 518 provided on the pressure plate 512 in a snap-fit or interference fit engagement. It will be appreciated, however, that the cover 514 may be coupled to the pressure plate 512 via other means of engagement, without departing from the scope of the disclosure.

The pressure plate 512 may be operatively coupled to the vertical member 510 with a fastener 520, which may be a mechanical fastener, that extends through a glazing pocket 522 defined laterally between the vertical member 510 and the pressure plate 512. The glazing pocket 522 may also be defined horizontally between the first and second glazing panels 504*a,b*. In the illustrated embodiment, the fastener 520 comprises a screw that may be received within or otherwise threaded into a vertical tongue 524 extending from and forming part of the vertical member 510.

In the illustrated application, a thermal tongue extension 526 is positioned within the glazing pocket 522 and interposes and otherwise extends between the pressure plate 512 and the vertical tongue 524. The thermal tongue extension 526 may form part of the vertical tongue 524 or otherwise extend therefrom, and the fastener 520 may be configured to penetrate the thermal tongue extension 526 to reach the vertical tongue 524. The thermal tongue extension 526 is made of material having low thermal conductivity (e.g., rubber, an elastomer, a low conductance polymer, etc.), thus helping to reduce the conductive pathway for thermal energy between the exterior environment of a building and the climate controlled interior of the building.

A vertically-extending thermal break gasket 528 interposes the pressure plate 512 and the thermal tongue extension 526. The thermal break gasket 528 may be made of rubber or an elastomer to facilitate a sealed interface against the inner wall (surface) of the pressure plate 512. The thermal break gasket 528 may also operate as a thermal barrier between the pressure plate 512 and the thermal tongue extension 526, thus further reducing the conductive pathway for thermal energy between the exterior and the interior.

As illustrated, the thermal break gasket 528 defines or otherwise provides a dart 530 sized to be received within a vertical channel 532 defined in the thermal tongue extension 526. It should be noted, however, that the thermal tongue extension 526 is not required in all embodiments. Instead, the thermal tongue extension 526 may be omitted and the vertical tongue 524 may alternatively extend toward the pressure plate 512. In such embodiments, the thermal break gasket 528 would interpose the pressure plate 512 and the vertical tongue 524, and the vertical channel 532 would be defined in the vertical tongue 524 to receive the dart 530.

The assembly 502 further includes a first vertically-extending exterior gasket 534*a* and a second vertically-extending exterior gasket 534*b* that interpose the first and second glazing panels 504*a,b*, respectively, and the pressure plate 512. Similar to the thermal break gasket 528, the exterior gaskets 534*a,b* may be made of rubber or an elastomer to provide a substantially sealed interface between the glazing panels 504*a,b* and the pressure plate 512 on the exterior of the building, thus helping to prevent the migration of fluids (e.g., water, air, etc.) into the glazing pocket 522 and potentially past the waterline.

The assembly 502 also includes a first vertically-extending interior gasket 536*a* and a second vertically-extending interior gasket 536*b*, alternately referred to as "glazing gaskets," that interpose the first and second glazing panels 504*a,b*, respectively, and the vertical member 510. Similar to the thermal break gasket 528, the interior gaskets 536*a,b* may also be made of rubber or an elastomer to provide a substantially sealed interface between the glazing panels 504*a,b* and the vertical member 510 on the interior of a building, thus helping to prevent the migration of fluids (e.g., water, air, etc.) into the glazing pocket 522 from the interior, and further preventing the migration of these fluids into the building. As illustrated, each interior gasket 536*a,b* defines or otherwise provides a dart 538 sized to be received within a corresponding vertical channel 540 defined in the vertical member 510.

In the prior art vertical member assembly 502 of FIG. 5, the thermal break thermal break gasket 528 and the interior gaskets 536*a,b* comprise independent structures required to be cut to length on site by an installer. The cut lengths of the thermal break gasket 528 may be coupled to the thermal tongue extension 526 (or the vertical tongue 524) by receiving the dart 530 into the vertical channel 532. Similarly, the cut lengths of the interior gaskets 536*a,b* may be coupled to the vertical member 510 by receiving the associated darts 538 into the corresponding vertical channels 540. As part of the prior art installation process, liquid silicone, rubber bonding cement, or another sealant must be applied by the installer to seal the corner joints where the vertical member

510 meets a corresponding horizontal member (not shown), and where the thermal break gasket 528 and the interior gaskets 536*a,b* meet corresponding horizontally-extending gaskets (not shown) that help form a seal on the interior of the assembly 502. The liquid sealant is also applied around joint plugs and over screw heads that couple the vertical and horizontal members together.

As can be appreciated, this process of cutting and installing the individual lengths of the thermal break and interior gaskets 528, 536*a,b*, and subsequently applying liquid sealant at appropriate locations on the interior frame is time consuming, requires skilled labor, and is prone to labor error. As described herein, a frame gasket and/or gasket assembly is disclosed and described that eliminates the need to cut gaskets to length, seal the joint between the vertical and horizontal curtain wall members, or seal the ends of the gaskets and joint plug areas.

Figure 6:
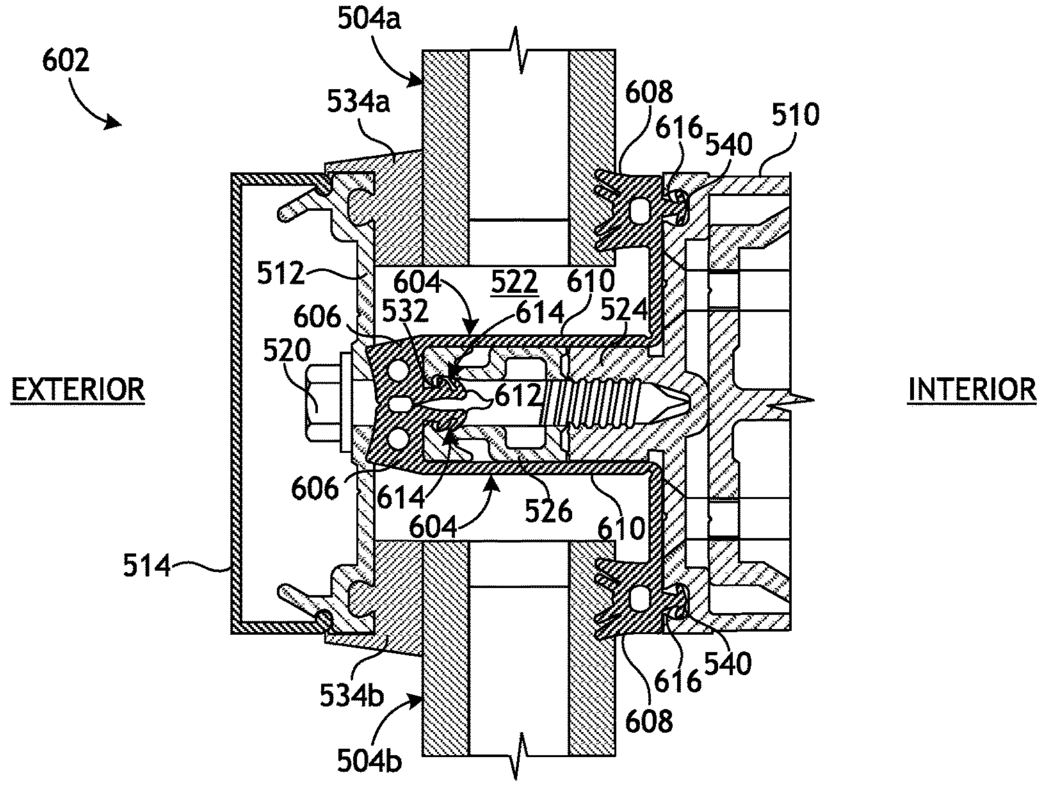
FIG. 6 is a cross-sectional top view of an example vertical member assembly taken along the lines 5-5 in FIG. 3, and in accordance with the principles of the present disclosure.

FIG. 6 is a cross-sectional top view of an example vertical member assembly 602 taken along the lines 5-5 in FIG. 3, and in accordance with the principles of the present disclosure. The vertical member assembly 602 may be similar in some respects to the prior art vertical member assembly 502 of FIG. 5 and, therefore, may be best understood with reference thereto, where like numerals will represent like components not described again in detail.

Similar to the vertical member assembly 502 of FIG. 5, for example, the vertical member assembly 602 of FIG. 6 includes the first and second panels 504*a,b*, the vertical member 510, the pressure plate 512, and the cover 514 removably coupled to the pressure plate 512. The pressure plate 512 may be operatively coupled to the vertical member 510 (i.e., the vertical tongue 524) with the fastener 520, which extends through the glazing pocket 522. Moreover, the vertical member assembly 602 also includes the thermal tongue extension 526 interposing the pressure plate 512 and the vertical tongue 524, but the thermal tongue extension 526 may alternatively be omitted from the assembly 602 and the vertical tongue 524 may instead extend further toward the pressure plate 512, as generally described above. Lastly, the assembly 602 further includes the first and second exterior gaskets 534*a,b* interposing the first and second glazing panels 504*a,b*, respectively, and the pressure plate 512.

Unlike the vertical member assembly 502 of FIG. 5, the vertical member assembly 602 of FIG. 6 includes one or more vertical bridge gaskets 604 (two shown on opposite sides of the vertical tongue 524 and the thermal tongue extension 526). Each vertical bridge gasket 604, also known as "mullion face gaskets," forms part of corresponding frame gasket that can be installed by a worker as a four-sided frame that acts as a monolithic water/air barrier that eliminates the need to wet seal the vertical-to-horizontal intersections and joint plug areas. As illustrated, the vertical bridge gaskets 604 each include a vertically-extending thermal break gasket 606 that interposes the pressure plate 512 and the thermal tongue extension 526 (or alternatively the vertical tongue 524), a vertically-extending interior gasket 608 that interposes the vertical member 510 and one of the glazing panels 504*a,b*, and a vertical bridge member 610 that extends between the vertically-extending thermal break gasket 606 and the vertically-extending interior gasket 608. Each vertical bridge gasket 604 comprises a monolithic structure, with the corresponding thermal break gasket 606 and the interior gasket 608 forming individual gasket sections with the vertical bridge member 610 extending therebetween.

The vertical bridge gaskets 604 may be entirely or partially made of rubber or an elastomer and thereby capable of providing sealed interfaces between the pressure plate 512 and the thermal tongue extension 526, and between the vertical member 510 and the glazing panels 504*a,b*. In at least one embodiment, the vertical bridge gaskets 604 may be made of extruded ethylene propylene diene monomer (EPDM), a typical material for architectural gaskets with good thermal and hardness properties.

The vertically-extending thermal break gasket 606 is similar in some respects to the thermal break gasket 528 of FIG. 5. Not only can the thermal break gasket 606 provide a sealed interface against the inner wall of the pressure plate 512, but the thermal break gasket 606 may also operate as a thermal barrier between the pressure plate 512 and the thermal tongue extension 526 (or the vertical tongue 524). Moreover, the thermal break gasket 606 defines or otherwise provides a dart 612 sized to be received within the vertical channel 532 defined in the thermal tongue extension 526 (or the vertical tongue 524). In some embodiments, as illustrated, the dart 612 may define or otherwise include one or more barbs 614 configured to help prevent the dart 612 from dislodging from the vertical channel 532 once installed.

The vertically-extending interior gasket 608 is similar in some respects to the interior gaskets 536*a,b* of FIG. 5. For example, the interior gasket 608 provides a substantially sealed interface between one of the glazing panels 504*a,b* and the vertical member 510 on the interior of a building. Moreover, the interior gasket 608 defines or otherwise provides a dart 616 sized to be received within the corresponding vertical channel 540 defined in the vertical member 510.

The vertical bridge member 610 extends between and effectively joins the thermal break gasket 606 and the interior gasket 608 to form a monolithic component part. The vertical bridge member 610 may comprise a generally thin section of material angled at about 90° to extend to each of the thermal break gasket 606 and the interior gasket 608. In other designs or applications, however, the vertical bridge member 610 may be angled at other angles to extend to the thermal break and interior gaskets 606, 608. The thin material provides flexibility to the vertical bridge gasket 604, which may prove advantageous in helping proper installation and location of the thermal break and interior gaskets 606, 608 in the corresponding vertical channels 532, 540.

In some embodiments, the vertical bridge gaskets 604 may be used independently of other gaskets. In such embodiments, the vertical bridge gasket 604 may be cut to length by an installer (worker) and the vertical darts 612, 616 of the vertically-extending thermal break and interior gaskets 606, 608, respectively, may be aligned with and inserted into the vertical channels 532, 540 defined in the thermal tongue extension 526 (or alternatively the vertical tongue 524) and the vertical member 510, respectively. The vertical bridge member 610 extends across joints between the vertical member 510 and any adjoining horizontal member, thus eliminating the need for the installer to apply liquid sealant at the joints or any plug areas.

In other embodiments, and as briefly mentioned above, the vertical bridge gaskets 604 may each form part of a corresponding curtain wall frame gasket. Each frame gasket will include two laterally-offset vertical bridge gaskets 604, and two vertically-offset horizontal bridge gaskets (described below with reference to FIG. 7). The vertical and horizontal bridge gaskets may be joined at the corners to form a four-sided gasket frame that can be installed on the interior of a curtain wall prior to installing the glazing panels (e.g., the glazing panels 504*a,b*). The frame gasket forms a monolithic water/air barrier that eliminates the need to wet seal the vertical-to-horizontal intersections and joint plug areas.

Figure 7:
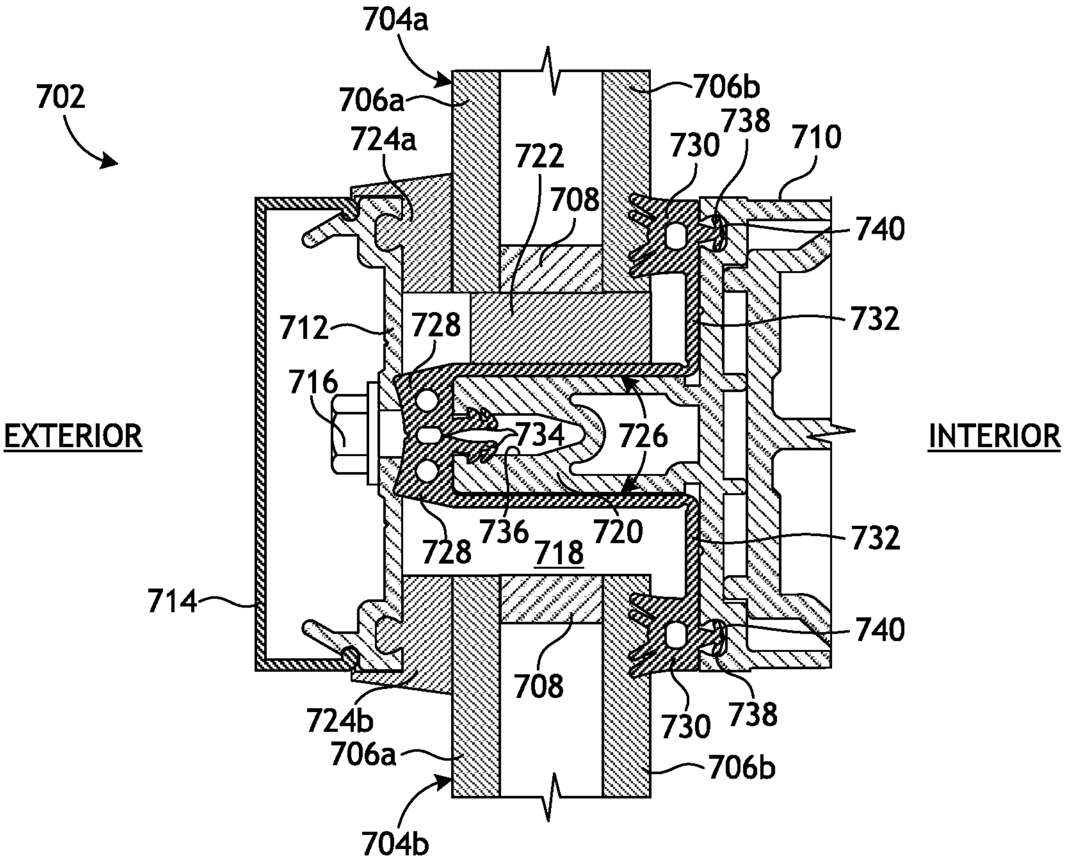
FIG. 7 is a cross-sectional side view of an example horizontal member assembly taken along the lines 7-7 in FIG. 3, and in accordance with the principles of the present disclosure.

FIG. 7 is a cross-sectional side view of an example horizontal member assembly 702 taken along the lines 7-7 in FIG. 3, according to one or more embodiments of the present disclosure. The horizontal member assembly 702 may not only form part of the curtain wall system 302 of FIG. 3, but may also form part of the curtain wall system 202 of FIG. 2. The horizontal member assembly 702 may be similar in some respects to the horizontal members 104*a-c* of FIG. 1 and may thus be horizontally oriented.

The horizontal member assembly 702 may be configured to help support and/or secure one or more glazing panels, shown in FIG. 7 as an upper glazing panel 704*a* and a lower glazing panel 704*b*. The upper and lower glazing panels 704*a,b* may be similar to the first and second glazing panels 504*a,b* of FIG. 5, and thus may each comprise one or more panes of window glass, one or more panes of polycarbonate, or one or more panels of material that are clear, translucent, tinted, or opaque, without departing from the scope of the disclosure. In at least one embodiment, one of the upper and lower glazing panels 704*a,b* may be the same as one of the first and second glazing panels 504*a,b*. As illustrated, each glazing panel 704*a,b* includes a first or "exterior" glass panel 706*a* and a second or "interior" glass panel 706*b* with a spacer 708 positioned therebetween. The space between the first and second glass panels 706*a,b* may be insulating, as described above with reference to the glazing panels 504*a,b*.

The horizontal member assembly 702 further includes a horizontal member 710 (alternately referred to as a "transom"), which may comprise a rigid extrusion made of aluminum or an aluminum alloy. The horizontal member assembly 702 further includes a pressure plate 712 and a cover 714 removably coupled to the pressure plate 712. Aside from being horizontally oriented, the pressure plate 712 and the cover 714 may be similar to the pressure plate 512 and the cover 514 of FIG. 5 and, therefore, will not be described again in detail.

The pressure plate 712 may be operatively coupled to the horizontal member 710 with a fastener 716, which may be a mechanical fastener, that extends through a glazing pocket 718 defined vertically between the horizontal member 710 and the pressure plate 712. The glazing pocket 718 may also be defined vertically between the first and second glazing panels 704*a,b*. In the illustrated embodiment, the fastener 716 comprises a screw that may be received within or otherwise threaded into a horizontal tongue 720 extending from or forming part of the horizontal member 710. In the illustrated embodiment, the horizontal tongue 720 extends almost to the pressure plate 712 within the glazing pocket 718. In other embodiments, however, a thermal tongue extension similar to the thermal tongue extension 526 of FIG. 5 may be positioned within the glazing pocket 718 and may interpose and otherwise extend between the pressure plate 712 and the horizontal member 710 (i.e., the horizontal tongue 720).

The horizontal member assembly 702 may further include one or more setting blocks 722 at least partially positioned within the glazing pocket 718 and used to help position and support the upper glazing panel 704*a* under the influence of gravity. More specifically, the setting block 722 may interpose the upper glazing panel 704*a* and the horizontal tongue 720 (or alternatively a thermal tongue extension, if used). Accordingly, the upper glazing panel 704*a* may rest directly on the setting block 722. In some embodiments, the setting block 722 may be made of rubber or an elastomer, but may alternatively be made of a polymer.

A first or upper exterior gasket 724*a* and a second or lower exterior gasket 724*b* interpose the upper and lower glazing panels 704*a,b*, respectively, and the pressure plate 712. The exterior gaskets 724*a,b* may be made of rubber or an elastomer and thereby provide a substantially sealed interface between the glazing panels 704*a,b* and the pressure plate 712 on the exterior of the building.

The horizontal member assembly 702 further includes one or more horizontal bridge gaskets 726 (two shown on opposite sides of the horizontal tongue 720). Similar to the vertical bridge gaskets 604 of FIG. 6, the horizontal bridge gaskets 726 may also each form part of a corresponding curtain wall frame gasket, described in more detail below. The horizontal bridge gaskets 726 each include a horizontally-extending thermal break gasket 728 that interposes the pressure plate 712 and the horizontal tongue 720 (or alternatively a thermal tongue extension), a horizontally-extending interior gasket 730 that interposes the horizontal member 710 and one of the glazing panels 704*a,b*, and a horizontal bridge member 732 that extends between the horizontally-extending thermal break gasket 728 and the horizontally-extending interior gasket 730. Similar to the vertical bridge gaskets 604, the horizontal bridge gaskets 726 may be entirely or partially made of rubber or an elastomer and thereby capable of providing sealed interfaces between the pressure plate 712 and the horizontal tongue 720 (or a thermal tongue extension), and between the horizontal member 710 and the glazing panels 704*a,b*. In at least one embodiment, the horizontal bridge gaskets 726 may be made of extruded ethylene propylene diene monomer (EPDM).

The horizontally-extending thermal break gasket 728 provides a sealed interface against the inner wall of the pressure plate 712, and may also operate as a thermal barrier between the pressure plate 712 and the horizontal tongue 720 (or a thermal tongue extension). Moreover, the thermal break gasket 728 defines or otherwise provides a dart 734 sized to be received within a horizontal channel 736 defined in the horizontal tongue 720 (or a thermal tongue extension). The darts 734 may be designed similar to the darts 612 of FIG. 6, and may operate similarly.

The horizontally-extending interior gasket 730 provides a substantially sealed interface between one of the glazing panels 704*a,b* and the horizontal member 710 on the interior of a building. Moreover, the interior gasket 730 defines or otherwise provides a dart 738 sized to be received within a corresponding horizontal channel 740 defined in the horizontal member 710.

The horizontal bridge member 732 extends between and effectively joins the thermal break gasket 728 and the interior gasket 730 to form a monolithic component part. The horizontal bridge member 732 may comprise a generally thin section of material angled at about 90° to extend to each of the thermal break gasket 728 and the interior gasket 730. In other designs or applications, however, the horizontal bridge member 732 may be angled at other angles to extend to the thermal break and interior gaskets 728, 730. The thin material is thin enough to allow room for the setting block 722 and provides flexibility to the horizontal bridge gasket 726, which may prove advantageous in helping proper installation and location of the thermal break and interior gaskets 728, 730 in the corresponding horizontal channels 736, 740.

Similar to the vertical bridge gaskets 604 of FIG. 6, in some embodiments, the horizontal bridge gaskets 726 may be used independently of other gaskets. In such embodiments, the horizontal bridge gasket 726 may be cut to length by an installer (worker) and the horizontal darts 734, 738 of the horizontally-extending thermal break and interior gaskets 728, 730, respectively, may be aligned with and inserted into the horizontal channels 736, 740 defined in the horizontal tongue 720 (or alternatively a thermal tongue extension) and the horizontal member 710, respectively. The horizontal bridge member 732 extends across joints between the horizontal member 710 and any adjoining vertical members (e.g., the vertical member 510 of FIGS. 5 and 6), thus eliminating the need for the installer to apply liquid sealant at the joints or any plug areas. In other embodiments, and as briefly mentioned above, the horizontal bridge gaskets 726 may each form part of a corresponding curtain wall frame gasket, which are described in more detail below.

Figure 8A:
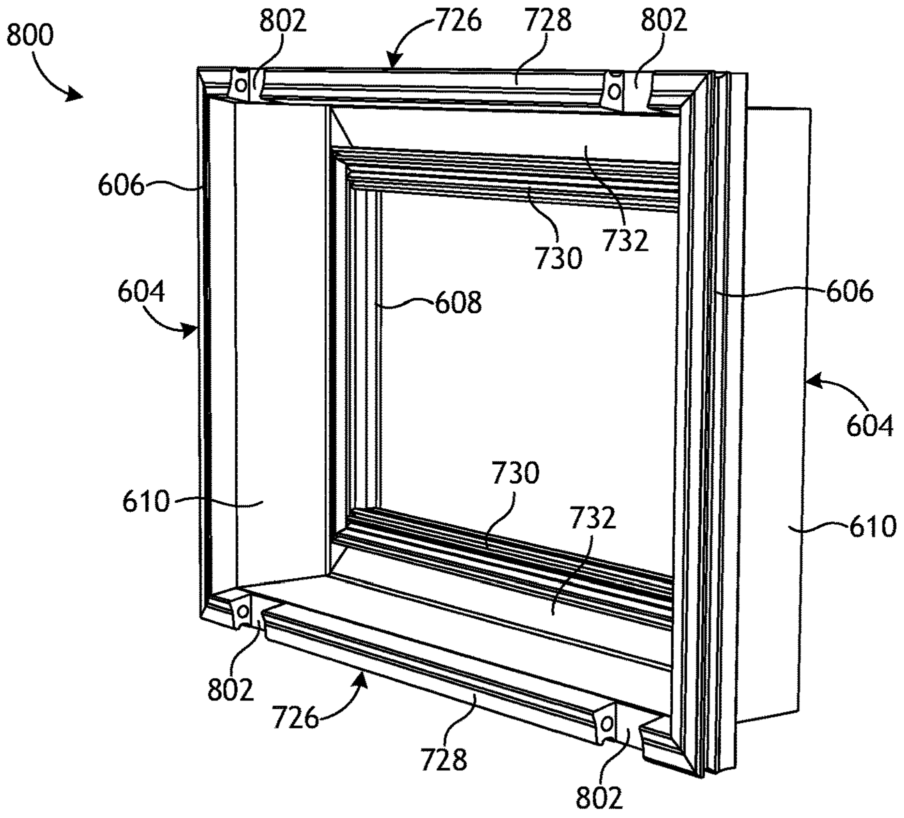
FIGS. 8A and 8B are isometric front and back views, respectively, of an example curtain wall frame gasket, in accordance with one or more embodiments of the present disclosure.
Figure 8B:
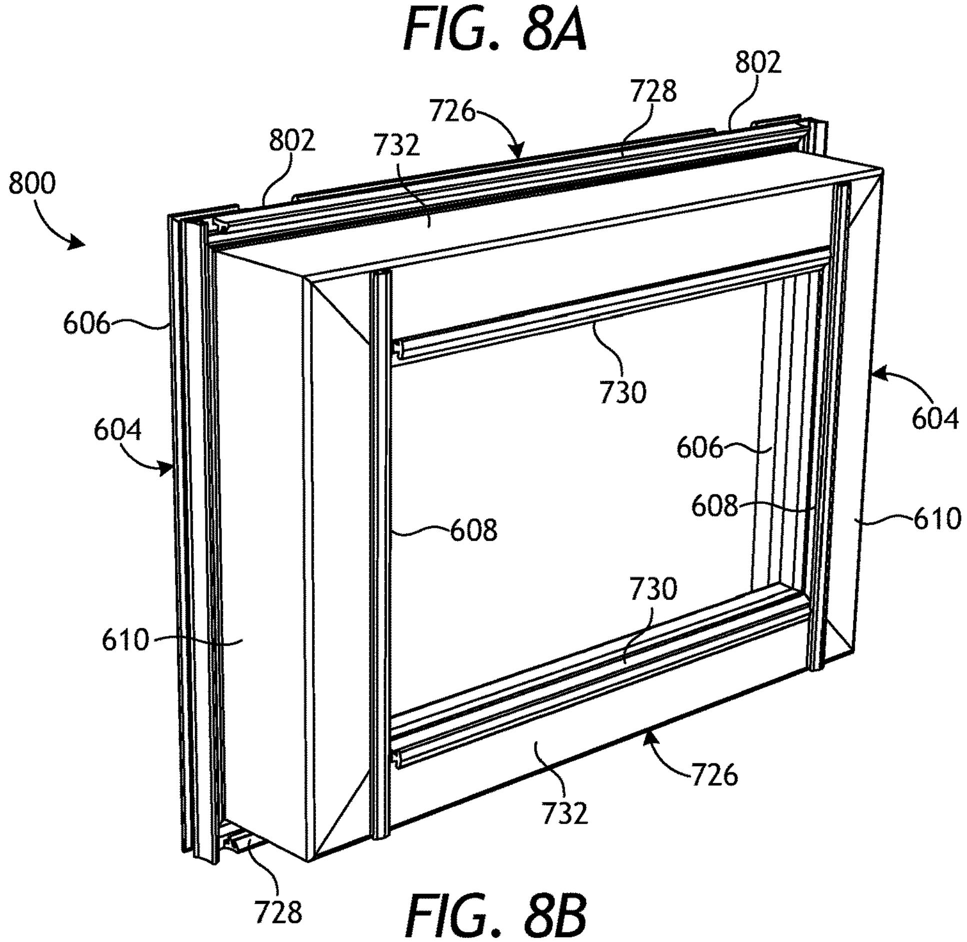

FIGS. 8A and 8B are isometric front and back views, respectively, of an example curtain wall frame gasket 800, in accordance with one or more embodiments of the present disclosure. The curtain wall frame gasket 800 (hereafter the "frame gasket 800") comprises a four-part assembly including two vertical bridge gaskets 604 laterally-offset from each other, and two horizontal bridge gaskets 726 vertically-offset from each other. As illustrated, the vertical bridge gaskets 604 each include the vertically-extending thermal break gasket 606, the vertically-extending interior gasket 608, and the vertical bridge member 610 that extends between the vertically-extending thermal break and interior gaskets 606, 608. Similarly, the horizontal bridge gaskets 726 each include the horizontally-extending thermal break gasket 728, the horizontally-extending interior gasket 730, and the horizontal bridge member 732 that extends between the horizontally-extending thermal break and interior gaskets 728, 730.

In some embodiments, the frame gasket 800 may be fabricated by a manufacturer and sent to jobsites as a monolithic, four-sided frame. Consequently, an installer need not cut gasket lengths to size on site. The frame gasket 800 may be fabricated by the manufacturer in several standard sizes used to secure and seal glazing panels (e.g., glazing panels 504*a,b*, 704*a,b* of FIGS. 6 and 7, respectively) of known (standard) dimensions. In other embodiments, however, the frame gasket 800 may be customizable and otherwise made-to-order based on job specific needs and dimensions of particular glazing panels.

To fabricate the frame gasket 800, the vertical and horizontal bridge gaskets 604, 726 are first manufactured using, for example known extrusion or molding techniques. In at least one application, the vertical and horizontal bridge gaskets 604, 726 may be molded using a rubber vulcanization process. Pairs of vertical and horizontal bridge gaskets 604, 726 are then cut to length corresponding to a particular glazing panel size, and the exposed ends of the cut vertical and horizontal bridge gaskets 604, 726 are subsequently joined together to form the four-sided frame gasket 800. In some embodiments, the ends of the vertical and horizontal bridge gasket 604, 726 pieces may be joined by injecting rubber into the corners to complete the molded corners. The formed frame gasket 800 may then be shipped to a job site ready for install.

In some embodiments, one or more reliefs 802 may be molded into or otherwise defined by the horizontal bridge gaskets 726. More particularly, the reliefs 802 may be formed into the horizontally-extending thermal break gasket sections 728, and each relief 802 may be vertically-aligned with another relief 802 defined in a vertically opposite horizontally-extending thermal break gasket 728. In some applications, the vertically-aligned reliefs 802 may be configured to accommodate vertical structural members that will be installed after a glazing panel and pressure plate are installed in conjunction with the frame gasket 800. In other applications, the vertically-aligned reliefs 802 may be configured to accommodate the vertically extending exterior gaskets 534*a*, 534*b*, 724*a* and 724*b* that run through in the vertical extending pressure plate 512, 712. The reliefs 802 eliminate the need for an installer to create (cut) notches to accommodate such vertical structural members (or the vertically extending exterior gaskets 534*a*, 534*b*, 724*a*, 724*b* and allow the corners of the vertical structural members to fit flush against adjacent metal parts.

Figure 9:
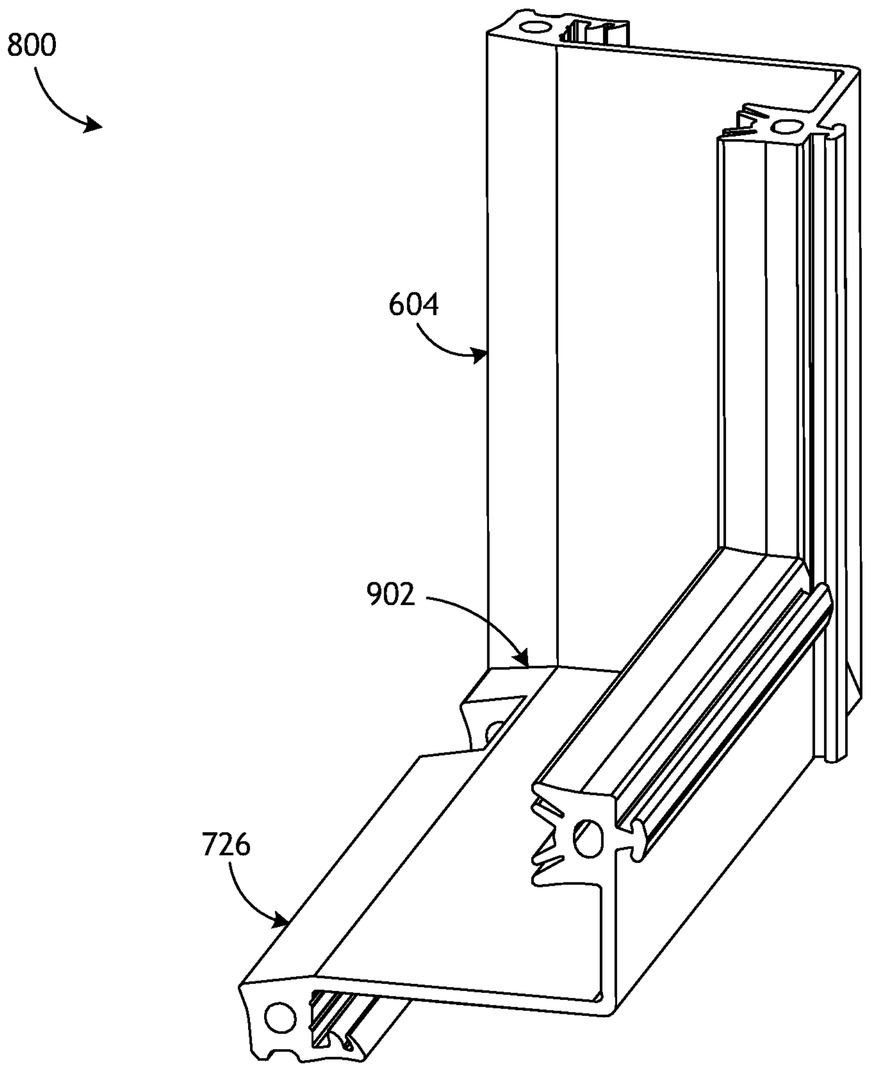
FIG. 9 is an isometric view of a cutaway portion of the frame gasket of FIGS. 8A-8B.

FIG. 9 is an isometric view of a cutaway portion of the frame gasket 800 of FIGS. 8A and 8B. In the illustrated view, a vertical bridge gasket 604 is joined to a horizontal bridge gasket 726 at a corner joint 902. In some embodiments, the corner joint 902 may form or facilitate a 90° angle between the vertical and horizontal bridge gaskets 604, 726. In other embodiments, however, the angle at the corner joint 902 may be greater or less than 90° depending on the installation application. As mentioned above, the corner joint 902 may be formed by the manufacturer by joining the exposed ends of the vertical and horizontal bridge gaskets 604, 726 and injecting rubber into and at the corner joint 902 to secure the vertical and horizontal bridge gaskets 604, 726 together. In other embodiments, the corner joint 902 could be pre-formed as a molded corner part and the ends of the vertical and horizontal bridge gaskets 604, 726 may be joined to the molded corner 902 by injecting rubber into and at the corner joint 902.

Figure 10:
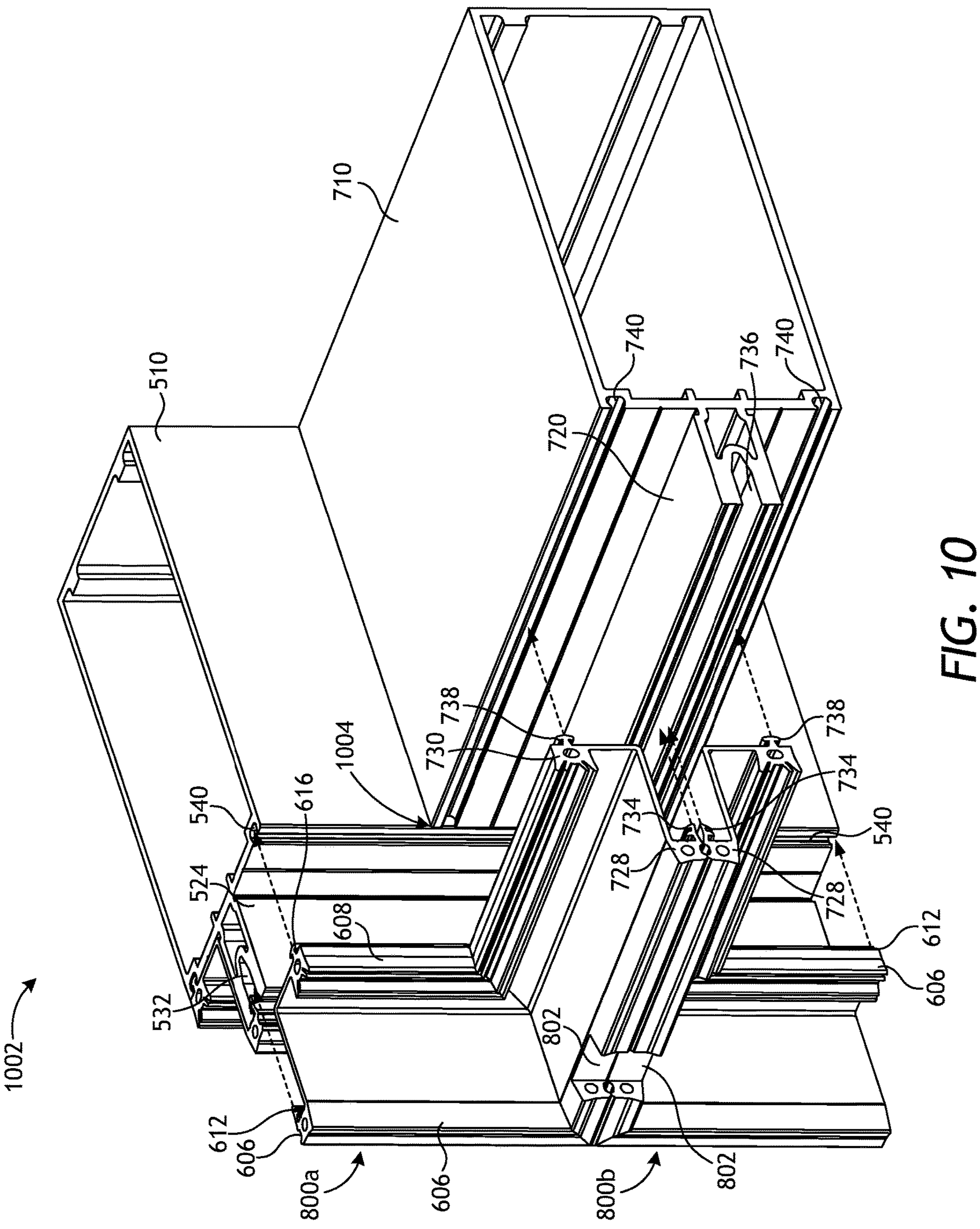
FIG. 10 is an isometric, cutaway view of a portion of another example curtain wall system, according to one or more embodiments.

FIG. 10 is an isometric, cutaway view of a portion of an example curtain wall system 1002, according to one or more embodiments. The curtain wall system 1002 may be the same as or similar to the curtain wall systems 202 or 302 of FIGS. 2 and 3, respectively. The view in FIG. 10 depicts example installation of a first frame gasket 800*a* and a second frame gasket 800*b*. The frame gaskets 800*a,b* may be similar to the frame gasket 800 of FIGS. 8A-8B and 9 and are shown in FIG. 10 as cutaway sections to facilitate viewing and description of the installation process.

As illustrated, the curtain wall system 1002 includes the vertical member 510 and the horizontal member 710 that meet at a joint 1004. To install the first frame gasket 800*a*, the installer (worker) aligns the vertical darts 612, 616 of the vertically-extending thermal break and interior gaskets 606, 608, respectively, with the vertical channels 532, 540 defined in the vertical tongue 524 (or alternatively a thermal tongue extension) and the vertical member 510, respectively, and inserts the vertical darts 612, 616 into the corresponding vertical channels 532, 540. Similarly, and simultaneously, the installer aligns the horizontal darts 734, 738 of the horizontally-extending thermal break and interior gaskets 728, 730, respectively, with the horizontal channels 736, 740 defined in the horizontal tongue 720 (or alternatively a thermal tongue extension) and the horizontal member 710, respectively, and inserts the horizontal darts 734, 738 into the horizontal channels 736, 740.

The second frame gasket 800*b* can be installed in a similar manner by aligning and inserting the vertical darts 612, 616 into the vertical channels 532, 540, and aligning and inserting the horizontal darts 734, 738 into the horizontal channels 736, 740. As illustrated, the reliefs 802 are vertically aligned when the first and second frame gaskets 800*a,b* are each installed.

Properly installing the first and second frame gaskets 800*a,b* provides monolithic water/air barriers that eliminate the need to wet seal the joint 1004 and joint plug areas with a liquid sealant. As a result, the likelihood of user error in applying liquid sealant is eliminated, which correspondingly reduces the chance of a leak developing after installation. Accordingly, the frame gaskets 800*a,b* can reduce installation costs by reducing the volume of liquid sealant needed for a job, and work performed by the installer is simplified as the cumbersome process of cutting gaskets into measured lineals from rolls is eliminated.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Although various example embodiments have been disclosed, a worker of ordinary skill in this art would recognize that certain modifications would come within the scope of this disclosure. For that reason, the following claims should be studied to determine the scope and content of this disclosure.

What is claimed is:

1. A curtain wall frame gasket, comprising:

first and second vertical bridge gaskets laterally-offset from each other, each vertical bridge gasket including:

a vertically-extending thermal break gasket;

a vertically-extending interior gasket; and a vertical bridge member extending between the vertically-extending thermal break and interior gaskets; and first and second horizontal bridge gaskets vertically-offset from each other, each horizontal bridge gasket including:

a horizontally-extending thermal break gasket;

a horizontally-extending interior gasket; and a horizontal bridge member extending between the horizontally-extending thermal break and interior gaskets;

wherein the first and second horizontal bridge gaskets extend between the first and second vertical bridge gaskets, wherein each end of the first and second horizontal bridge gasket is joined to a corresponding end of the first and second vertical bridge gasket at a corresponding corner joint to define a continuous, unitary four-sided frame, and wherein the first and second vertical bridge gaskets are configured to be coupled to laterally offset first and second vertical members of a curtain wall system and the first and second horizontal bridge gaskets are configured to be coupled to vertically offset first and second horizontal members of the curtain wall system, thereby covering curtain wall joints located between each of the vertical and horizontal members.

2. The curtain wall frame gasket of claim 1, further comprising:

a first relief defined in the first horizontal bridge gasket; and a second relief defined in the second horizontal bridge gasket and vertically-aligned with the first relief.

3. The curtain wall frame gasket of claim 1, wherein each corner joint of the corresponding corner joints forms a 90° angle between each end of the first and second horizontal bridge gaskets and the corresponding end of the first and second vertical bridge gaskets.

4. The curtain wall frame gasket of claim 1, wherein the vertical bridge member is angled by about 90° to extend to each of the vertically-extending thermal break and interior gaskets, and wherein the horizontal bridge member is angled by about 90° to extend to each of the horizontally-extending thermal break and interior gaskets.

5. The curtain wall frame gasket of claim 1, further comprising:

a first vertical dart extending along at least a portion of the length of the vertically-extending thermal break gasket;

a second vertical dart extending along at least a portion of the length of the vertically-extending interior gasket;

a first horizontal dart extending along at least a portion of the length of the horizontally-extending thermal break gasket; and a second horizontal dart extending along at least a portion of the length of the horizontal-extending interior gasket.

6. The curtain wall frame gasket of claim 5, further comprising one or more barbs defined on one or both of the first vertical dart and the first horizontal dart.

7. A curtain wall system, comprising:

a vertical member;

a horizontal member coupled to the vertical member at a curtain wall joint;

a first vertical bridge gasket coupled to the vertical member and a second vertical bridge gasket laterally offset from the first vertical bridge gasket, each vertical bridge gasket including:

a vertically-extending interior gasket;

a vertically-extending thermal break gasket; and a vertical bridge member extending between the vertically-extending interior and thermal break gaskets; and a first horizontal bridge gasket coupled to the horizontal member and joined to the first vertical bridge gasket at a corner joint, and a second horizontal bridge gasket vertically-offset from the first horizontal bridge gasket, each horizontal bridge gasket including:

a horizontally-extending interior gasket;

a horizontally-extending thermal break gasket; and a horizontal bridge member extending between the horizontally-extending interior and thermal break gaskets;

wherein the first vertical and horizontal bridge gaskets cover the curtain wall joint between the vertical and horizontal members, and wherein the first and second horizontal bridge gaskets extend between the first and second vertical bridge gaskets, and wherein each end of the first and second horizontal bridge gasket is joined to a corresponding end of the first and second vertical bridge gasket at a corresponding said corner joint to define a continuous, unitary four-sided frame.

8. The curtain wall system of claim 7, wherein the vertical bridge member is angled by about 90° to extend to each of the vertically-extending thermal break and interior gaskets, and wherein the horizontal bridge member is angled by about 90° to extend to each of the horizontally-extending thermal break and interior gaskets.

9. The curtain wall system of claim 7, wherein the vertical member defines a first vertical channel and a second vertical channel, and the horizontal member defines a first horizontal channel and a second horizontal channel, and wherein:

the vertically-extending interior gasket is coupled to the first vertical channel;

the vertically-extending thermal break gasket is coupled to the second vertical channel;

the horizontally-extending interior gasket is coupled to the first horizontal channel; and the horizontally-extending thermal break gasket is coupled to the second horizontal channel.

10. The curtain wall system of claim 9, further comprising a glazing panel mounted adjacent the vertical and horizontal members, wherein the vertically-extending interior gasket interposes the vertical member and the glazing panel, and the horizontally-extending interior gasket interposes the horizontal member and the glazing panel.

11. The curtain wall system of claim 9, further comprising:

a vertical tongue extending from the vertical member;

a first thermal tongue extension interposing the vertically-extending thermal break gasket and the vertical tongue, wherein the second vertical channel is defined in the first thermal tongue extension;

a horizontal tongue extending from the horizontal member; and a second thermal tongue extension interposing the horizontally-extending thermal break gasket and the horizontal tongue, wherein the second vertical channel is defined in the second thermal tongue extension.

12. The curtain wall system of claim 9, further comprising:

a first vertical dart extending along at least a portion of the length of the vertically-extending interior gasket and received within the first vertical channel;

a second vertical dart extending along at least a portion of the length of the vertically-extending thermal break gasket and received within the second vertical channel;

a first horizontal dart extending along at least a portion of the length of the horizontally-extending interior gasket and received within the first horizontal channel; and a second horizontal dart extending along at least a portion of the length of the horizontally-extending thermal break gasket and received within the second horizontal channel.

13. The curtain wall system of claim 9, wherein the vertical member provides a vertical tongue that defines the second vertical channel, and the horizontal member provides a horizontal tongue that defines the second horizontal channel.

14. The curtain wall system of claim 13, further comprising:

a first pressure plate secured to the vertical tongue with a first fastener, wherein the vertically-extending thermal break gasket interposes the first pressure plate and the vertical tongue; and a second pressure plate secured to the horizontal tongue with a second fastener, wherein the horizontally-extending thermal break gasket interposes the second pressure plate and the horizontal tongue.

15. A method of sealing an interior of a curtain wall system including first and second vertical members laterally offset from each other and first and second horizontal members vertically offset from each other and coupled to the first and second vertical members at corresponding curtain wall joints, the method comprising:

coupling first and second vertical bridge gaskets to the first and second vertical members, each vertical bridge gasket including:

a vertically-extending interior gasket;

a vertically-extending thermal break gasket; and a vertical bridge member extending between the vertically-extending interior and thermal break gaskets;

coupling first and second horizontal bridge gaskets to the first and second horizontal members, each horizontal bridge gasket being joined to the first and second vertical bridge gaskets at corresponding corner joints and including:

a horizontally-extending interior gasket;

a horizontally-extending thermal break gasket; and a horizontal bridge member extending between the horizontally-extending interior and thermal break gaskets;

joining each end of the first and second horizontal bridge gaskets to a corresponding end of the first and second vertical bridge gaskets at corresponding corner joints and thereby defining a continuous, unitary four-sided frame; and covering the curtain wall joints between the vertical and horizontal members with the vertical and horizontal bridge gaskets.

16. The method of claim 15, wherein the vertical member defines first and second vertical channels, and the horizontal member defines a first and second horizontal channels, the method further comprising:

coupling the vertically-extending interior gasket to the first vertical channel;

coupling the vertically-extending thermal break gasket to the second vertical channel;

coupling the horizontally-extending interior gasket to the first horizontal channel; and coupling the horizontally-extending thermal break gasket to the second horizontal channel.

17. The method of claim 16, further comprising:

mounting a glazing panel adjacent the vertical and horizontal members;

arranging the vertically-extending interior gasket between the vertical member and the glazing panel; and arranging the horizontally-extending interior gasket between the horizontal member and the glazing panel.

18. The method of claim 16, wherein the vertical member provides a vertical tongue that defines the second vertical channel, and the horizontal member provides a horizontal tongue that defines the second horizontal channel, the method further comprising:

securing a first pressure plate to the vertical tongue with a first fastener, wherein the vertically-extending thermal break gasket interposes the first pressure plate and the vertical tongue; and securing a second pressure plate to the horizontal tongue with a second fastener, wherein the horizontally-extending thermal break gasket interposes the second pressure plate and the horizontal tongue.

19. The method of claim 16, wherein the vertical member provides a vertical tongue and the horizontal member provides a horizontal tongue, the method further comprising:

arranging a first thermal tongue extension between the vertically-extending thermal break gasket and the vertical tongue, wherein the second vertical channel is defined in the first thermal tongue extension; and arranging a second thermal tongue extension between the horizontally-extending thermal break gasket and the horizontal tongue, wherein the second vertical channel is defined in the second thermal tongue extension.

* * * * *